US008111821B2

(12) United States Patent
Ollason

(10) Patent No.: US 8,111,821 B2
(45) Date of Patent: Feb. 7, 2012

(54) AUTOMATED FOLLOW-UP CALL IN A TELEPHONE INTERACTION SYSTEM

(75) Inventor: David G. Ollason, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1219 days.

(21) Appl. No.: 11/077,882

(22) Filed: Mar. 11, 2005

(65) Prior Publication Data
US 2006/0203989 A1 Sep. 14, 2006

(51) Int. Cl.
H04M 3/42 (2006.01)
H04M 3/00 (2006.01)

(52) U.S. Cl. .............. 379/210.01; 379/265.02
(58) Field of Classification Search .......... 379/210.01, 379/265.02
See application file for complete search history.

(56) References Cited

U.S. PATENT DOCUMENTS 5,682,421 A * 10/1997 Glovitz et al. ........ 379/100.05
5,696,965 A * 12/1997 Dedrick .................. 707/10
6,512,825 B1 * 1/2003 Lindholm et al. ...... 379/266.01
2004/0057570 A1 * 3/2004 Power et al. ........... 379/265.13
2005/0216363 A1 * 9/2005 Vaccarelli et al. ............ 705/26
2006/0023863 A1 * 2/2006 Joseph et al. .......... 379/265.02
2006/0126818 A1 * 6/2006 Berger et al. .......... 379/265.09

OTHER PUBLICATIONS

VoiceGenie and VoxSurf Announce Speech-Driven Multi-Channel Communication Solution, press release, Sep. 16, 2002.
Intervoice, Omviam™ Speech Call Flow Components, Product Capabilities Review, Jul. 17, 2003.
"FUJITSU Call Center System CCRM-1 Product Description" FUJITSU Call Center System CCCRM-1—Product Description, FUJITSU, Sep. 2002.
"Voice Dialer 364 Data Book", Interactive Speech, Sensory Voice Activation, Sensory, Inc. P/N 80-0174-4, 2000.
MacLoed, R., "Linking the New Network to the PSTN Call Management Features on the Brooktrout TR 1000", Brooktrout Technolgoy, Jun. 2000.
Nortel Networks Corporate Directory Dialer brochure, www.nortelnetworks.com., Copyright 2003.

* cited by examiner

Primary Examiner — Rasha Al Aubaidi
(74) Attorney, Agent, or Firm — Merchant & Gould

(57) ABSTRACT

A follow-up call to a user is made after completion of a first call with a voice user interface module operable on a computer. The voice user interface module inquiries about information communicated in the first call.

13 Claims, 4 Drawing Sheets

AUTOMATED FOLLOW-UP CALL IN A TELEPHONE INTERACTION SYSTEM

BACKGROUND OF THE INVENTION

The present invention generally pertains to call centers such as interactive computer systems with access provided through a telephone. More specifically, the present invention pertains to improving the user experience by confirming or verifying the user's satisfaction with the information provided by the call center.

Call centers are used by many companies to provide product support or otherwise enable customers to obtain information. Typically, a customer makes a call to the call center and is held in a queue awaiting an attendant, operator or the system to free up resources to answer the call. Some call centers may be automated where an interactive voice response system makes inquiries upon the caller to classify the need of the caller for proper routing to an attendant or operator, or is fully automated and provides information believed correct to satisfy the customer's problem or inquiry.

In many instances the caller is provided with information comprising for example a set of instructions or tasks that he or she will implement after hanging up. For instance, to help with a software or a computer problem, the customer may be asked to make a series of setting changes, reboot the computer, and start the application again to fix a problem.

Frustration however will develop if the information provided to the customer does not solve the problem. In many instances, the customer is not as frustrated with the fact the information did not solve the problem, but rather may be more frustrated knowing the time that is necessary to call the call center again, answer the initial inquiries to classify the call, if required, wait in a queue, re-describe the problem all in an attempt to hopefully obtain another possible solution.

The present invention provides solutions to one or more of the above-described problems and/or provides other advantages over the prior art.

SUMMARY OF THE INVENTION

A follow-up call to a user is made after completion of a first call with a voice user interface module operable on a computer. The voice user interface module inquiries about information communicated in the first call, typically, whether any outstanding problem exists that was communicated in the first call.

In a further embodiment, if the user indicates that a problem still exists, the follow-up call is transferred such that the user can obtain additional help regarding the problem. In some systems, this may entail transferring the follow-up call to an input queue. In order that the follow-up call is handled quickly, the follow-up call can be identified with a priority higher than other incoming calls.

This method of providing an automated follow-up call does not require a human operator, and thus, is not labor intensive and thereby can be done at a low cost. In many instances, hopefully, the information provided in the first call will satisfy the user's inquiry or problem. However, in the event, additional help is needed, such users are efficiently identified via the automated follow-up call.

Other features and benefits that characterize embodiments of the present invention will be apparent upon reading the following detailed description and review of the associated drawings.

DETAILED DESCRIPTION OF ILLUSTRATIVE EMBODIMENTS

An aspect of the present invention pertains to generating a follow-up call automatically and preferably with a voice user interactive computer system that inquires whether the information provided in response to the caller's initial call solved the caller's problem. If the problem has not been solved, or there are other outstanding issues, the call can be transferred to attendant or operator, or can be placed in a queue of incoming calls, but preferably marked with higher priority. Customer satisfaction is improved because the customer receives the personal attention of a follow-up call, and if problems still exist immediate attention to address the problems.

Examples of well-known computing systems, environments, and/or configurations that may be suitable for use with the invention include, but are not limited to, personal computers, server computers, hand-held or laptop devices, multiprocessor systems, microprocessor-based systems, and programmable dialing applications. Embodiments can be implemented in association with any number of applications that a user interacts with over a telephone such as applications that render help, directions or other types of information.

Prior to discussing embodiments of the present invention in detail, an exemplary computing environment within which the embodiments and their associated systems can be implemented will be discussed.

Figure 1:
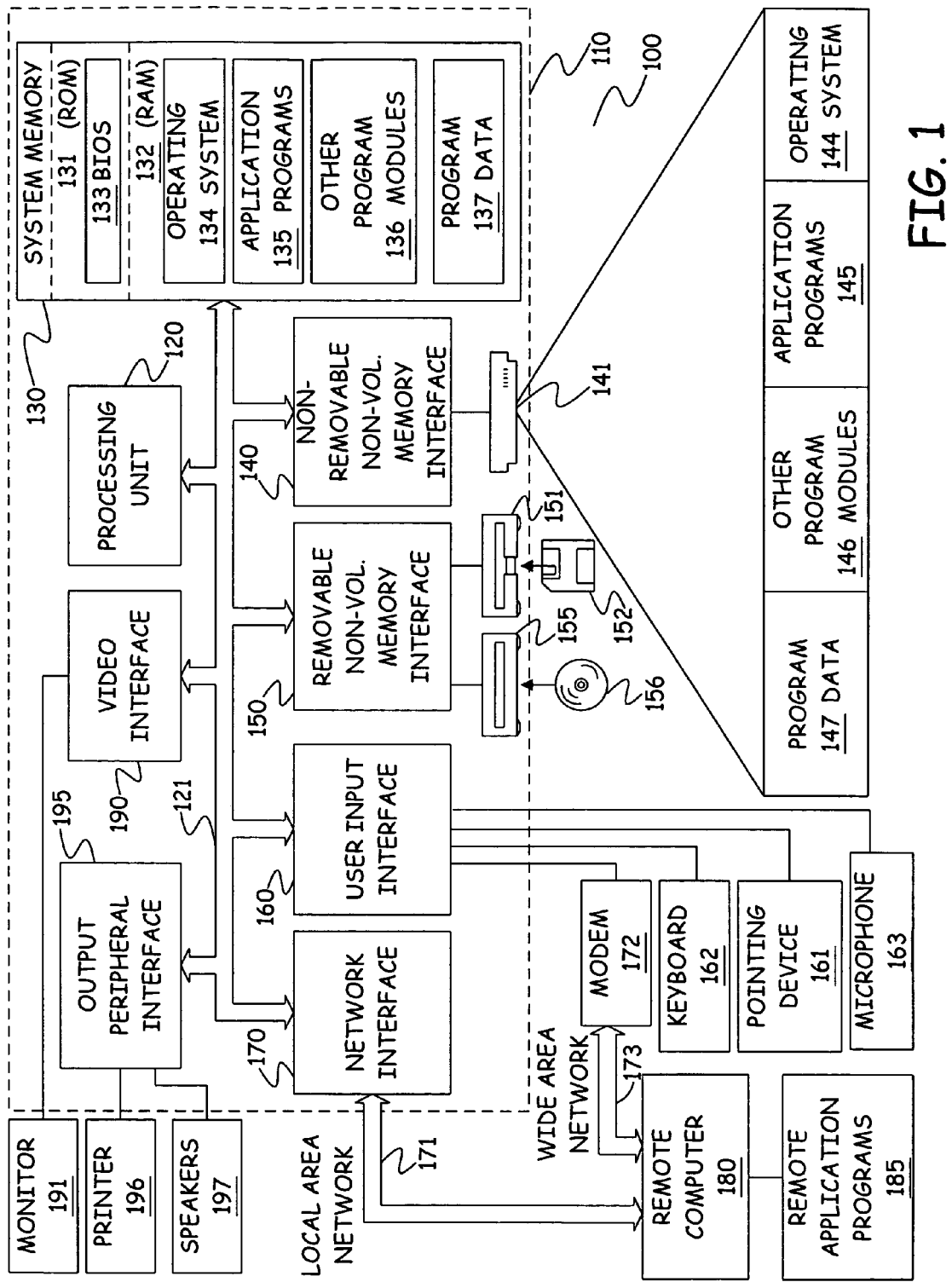
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and figures as processor executable instructions, which can be written on any form of a computer readable media.

The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which also represents a telephone), and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer

180. It will be appreciated that the network connections shown are exemplary and other means of establishing a communications link between the computers may be used.

Figure 2:
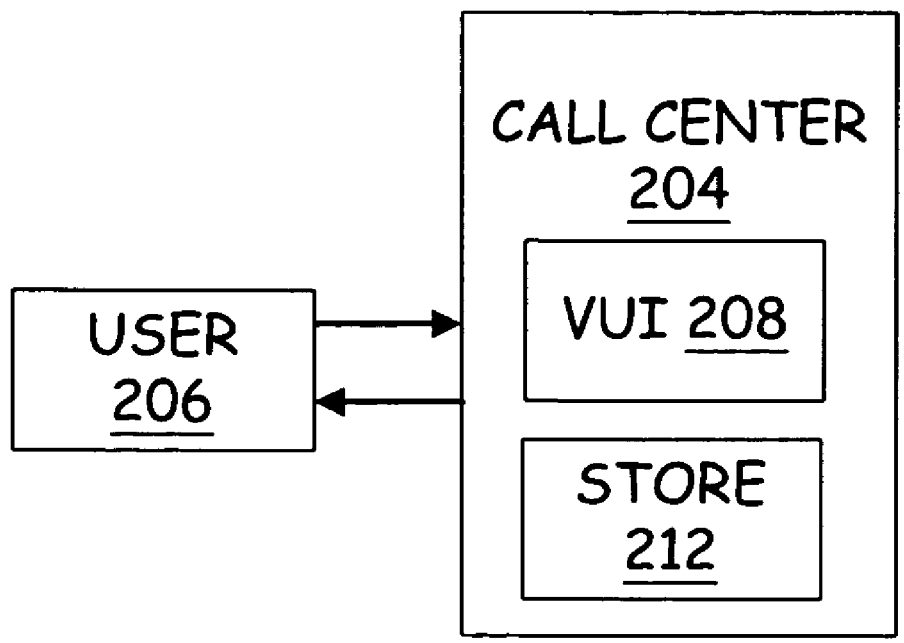
FIG. 2 is a schematic block diagram of a call center.

FIG. 2 is a schematic block diagram of a call center 204, adapted to receive calls from customers or users 206 seeking information. In addition to receiving calls, call center 204 includes a voice user interface 208 that is adapted to automatically place follow-up calls back to users 206 in order to ascertain if the information provided solved the user's problem or if there are any other outstanding issues. Although illustrated as forming part of call center 204 in FIG. 2, it should be understood that voice user interface 208 need not be necessarily incorporated therewith, but rather simply operable therewith in that each of the systems can be separate or independent systems, for example, embodied each on a general computer described above.

Figure 3:
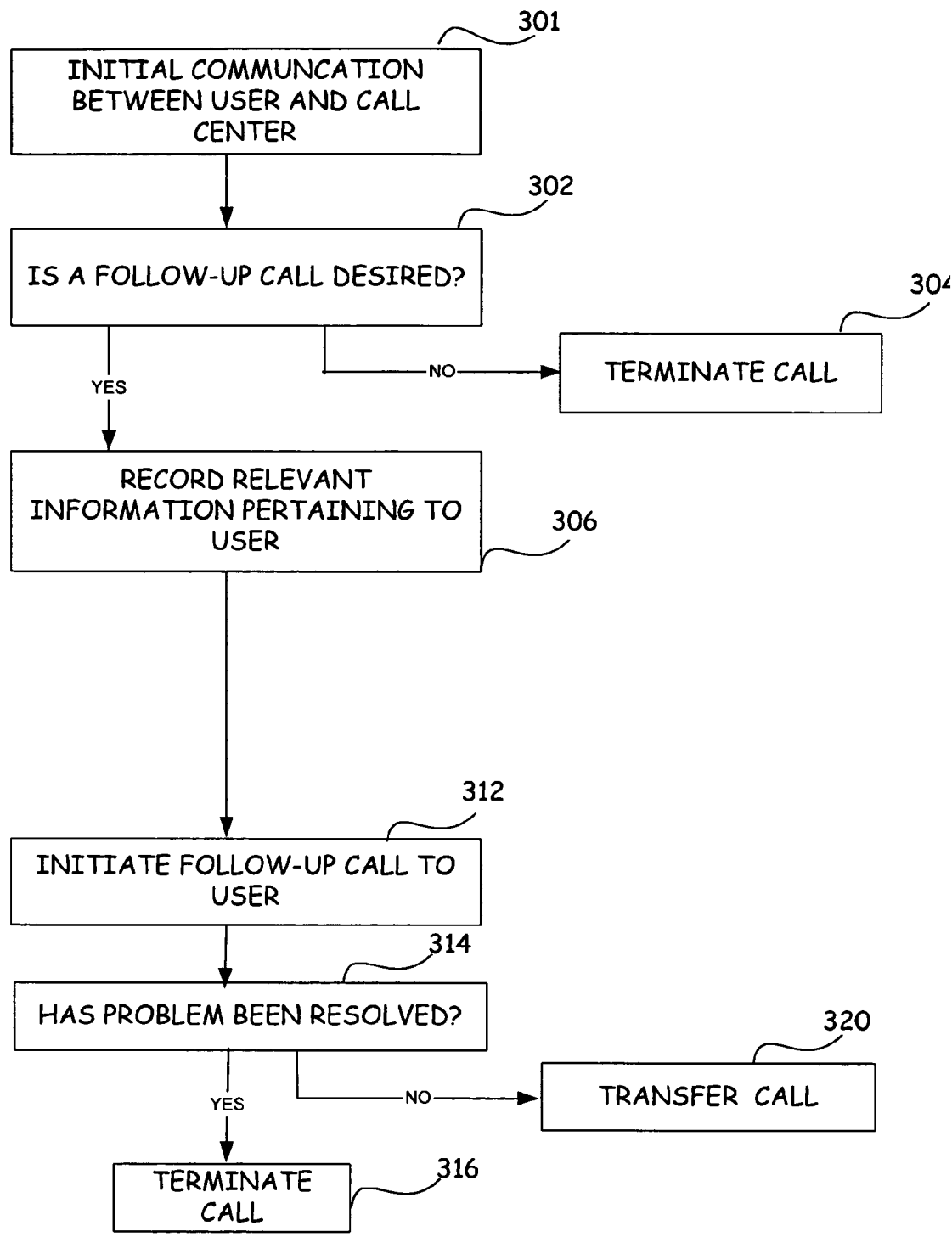
FIG. 3 is a method for initiating a follow-up call.

FIG. 3 illustrates a method 300 of automatically providing a follow-up call executable with call center 204 and voice user interface 208. Step 301 represents initial communication between user 206 and call center 204 where user 206 has obtained some information. Typically, such communications initiate from a call made by user 206; however in yet other applications, call center 204 may have initiated the call.

At step 302, which is typically although not necessarily after the information has been provided at step 300, call center 204 queries whether the user 206 would like a follow-up call concerning the matter at hand. If user 206 declines, the call is terminated at step 304 and call center 204 moves onto the next call that may be waiting in an input queue. However, if user 206 answers in the affirmative, call center 204 records relevant information pertaining to the user 206 at step 308. Typically, such information includes the telephone number of user 206 to which the follow-up call will be placed. The telephone number can be obtained from user 206 directly or based on caller identifier information or data commonly sent now days in telephone exchange networks.

Other information that can be included is the call back time. The call back time can be solicited from user 206 as an exact time or a relative term such as one, two or three hours following the initial call. In yet a further embodiment, the call back time can be automatically calculated, for example, based upon some selected time period following the initial call at step 300.

If desired, information about the type of call can also be recorded. For instance, if call center 204 includes an interactive voice response system, or a system that responds to key presses on the phone, where such a system is used to query the user as to the nature of the problem or information desired in order to classify the call and/or direct it to an appropriate attendant, this information or a portion thereof can also be recorded and used, if necessary, as discussed below.

Storage of some or all of the foregoing information is represented by store 212 in FIG. 2. However, it should be understood that queries regarding this information need not be generated from a computer, but can also be initiated based on a human operator, where the human operator gathers and causes some or all of the foregoing information to be stored in store 212 at step 306.

At step 312, voice user interface 208 initiates the follow-up call to user 206 at the selected time, for instance, as stored in store 212. Using voice generated prompts, voice user interface 208 asks the user at step 314 if the problem had been resolved, and/or if there are any outstanding issues. If the user indicates that the problem has been resolved, the call is terminated at step 316 and the voice user interface 208 proceeds with the next follow-up call at its corresponding follow-up call time. However, if the user indicates that one or more problems still exist, voice user interface 208 can transfer the call to the incoming queue at step 320. In a further embodiment, this call can be identified so that it gets higher priority and dealt with as soon as possible. If information had been stored pertaining to the initial call as discussed above so as to classify the call and/or aid in its proper routing to the appropriate attendant, this information can be accessed and used by voice user interface 208 to properly route the user to the appropriate attendant of system.

Generating a follow-up call automatically with voice user interface 208 is particularly efficient because a human operator is not used. In contrast, providing a follow-up call using a human operator would be extremely expensive especially as many calls will be wasted in the sense that, hopefully, the problem has been successfully resolved in the majority of cases.

Figure 4:
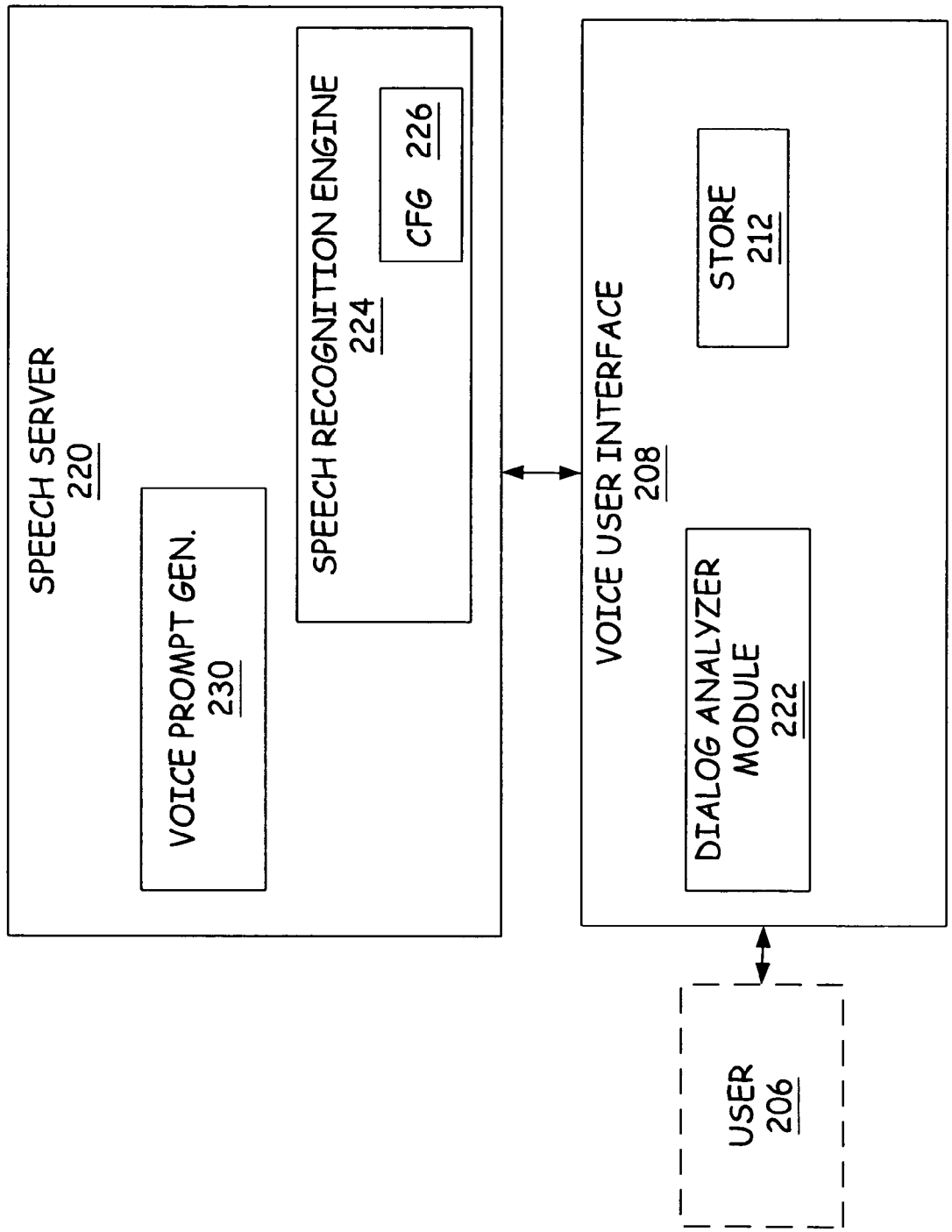
FIG. 4 is a schematic block diagram of a voice user interface.

FIG. 4 illustrates in greater detail components or modules of voice user interface 208 in accordance with one exemplary embodiment. In FIG. 4, users 206 are in dashed lines to illustrate that, while these operate with voice user interface 208, they are not themselves part of voice user interface 208.

Hereinafter, interface 208 will be described with respect to a system adapted to perform speech recognition. Nevertheless, it should be understood that in other embodiments interface 208 can be configured to respond to non-verbal user instructions such as but not limited to responding to DTMF signals transmitted by the user through operation of the telephone keypad. Such systems include DTMF recognition modules for receiving user DTMF responses and are well-known in the art. The manner in which the user provides responses is not critical.

In the embodiment of FIG. 4 voice user interface 208 has access to a speech server 220. Voice user interface 208 includes or can access store 212 having the follow-up call information and a dialog analyzer module 222. In one illustrative embodiment, speech server 220 hosts or contains a speech recognition engine 224 having a grammar 226 (herein exemplified as a CFG). Speech server 220 also stores a voice prompt generator module 230 that can provide synthesized speech from text and/or stored recordings of a human speaker.

It should be noted that voice user interface 208, store 212, voice prompt generator module 230, speech recognition engine 224, grammar 226 and dialog analyzer module 222 need not necessarily be implemented within the same computing environment. For example, voice user interface 208 and its associated store 212 could be operated from a first computing device that is in communication via a network with a different computing device operating recognition engine 224 and its associated grammar 226. These and other distributed implementations are within the scope of the present invention. Furthermore, the modules described herein and the functions they perform can be combined or separated in other configurations as appreciated by those skilled in the art.

Although the present invention has been described with reference to particular embodiments, workers skilled in the art will recognize that changes may be made in form and detail without departing from the spirit and scope of the invention.

What is claimed is:

1. A method of providing a follow-up call to a user in a telephone interactive system, the method comprising:
communicating with a user in a first telephone call initiated by the user;
recording information during the first telephone call, wherein a portion of the recorded information comprises information obtained from a plurality of telephone key presses made by the user in response to a query the user, the information comprising a nature of a user problem, information for classifying the first telephone call and information directing the first telephone call to an attendant associated with the telephone interactive system;
inquiring whether the user desires a follow-up telephone call with a module operable on a computer;
determining that the user does desire a follow-up telephone call with the module;
obtaining a time selected by the user to make the follow-up telephone call with the module;
storing the selected time on a computer;
making the follow-up telephone call at the selected time after completion of the first telephone call with a voice user interface module operable on a computer, the voice user interface module inquiring about the information communicated in the first telephone call, wherein the voice user interface module accesses and uses the information for classifying the first telephone call and the information for directing the first telephone call to the attendant to route the user to the attendant upon a determination, by the voice user interface module, that the user has an outstanding problem; and
responding to, with the voice user interface module, non-verbal user instructions comprising Dual Tone Multi-Frequency (DTMF) signals transmitted through operation of a telephone keypad.

2. The method of claim 1 wherein making the follow-up telephone call includes inquiring if the user has the outstanding problem.

3. The method of claim 2 wherein if the user has the outstanding problem, transferring the follow-up telephone call.

4. The method of claim 3 wherein if the user has the outstanding problem, the follow-up telephone call is identified with priority higher than other calls.

5. The method of claim 1 wherein communicating with the user includes obtaining a phone number for the follow-up telephone call.

6. The method of claim 5 wherein obtaining the phone number includes using caller identifier data.

7. The method of claim 5 wherein obtaining the phone number includes obtaining the phone number directly from the user.

8. The method of claim 1 wherein obtaining the time to make the follow-up telephone call includes obtaining an exact time directly from the user.

9. A computer-readable storage medium having instructions for processing calls in a telephone interactive system, the instructions comprising:
obtaining in a first telephone call:
first information communicated by a plurality of telephone key presses made by the user in response to query as to the nature of a user problem, the first information comprising a nature of a user problem, information for classifying the first telephone call and information for directing the first telephone call to an attendant associated with the telephone interactive system;
second information comprising a time selected by a user for making a follow-up telephone call; and
storing the first and second information;
receiving notification that the user in the first telephone call desires the follow-up telephone call;
accessing the stored first and second information related to making the follow-up telephone call;
initiating the follow-up telephone call at the selected time based on the stored second information;
asking the user if the user problem exists related to the first telephone call;
using the information for classifying the first telephone call and the information for directing the first telephone call to the attendant to route the user to the attendant upon a determination that the user problem exists related to the first telephone call; and
responding to non-verbal user instructions, the non-verbal user instructions comprising Dual Tone Multi-Frequency (DTMF) signals transmitted by the user through operation of a telephone keypad.

10. The computer-readable storage medium of claim 9 and further comprising instructions for transferring the follow-up telephone call if the user problem exists.

11. The computer-readable storage medium of claim 10 and further comprising instructions for identifying the follow-up telephone call with a priority higher than other calls.

12. The computer-readable storage medium of claim 9, further comprising storing third information comprising a phone number for the follow-up telephone call.

13. The method of claim 12 wherein obtaining the third information comprises obtaining a relative time directly from the user.

\* \* \* \* \*